US010263685B1

United States Patent
Kochetkov et al.

(10) Patent No.: US 10,263,685 B1
(45) Date of Patent: Apr. 16, 2019

(54) INTERMEDIATE FREQUENCY COMBINER WITH BASEBAND DELAY

(71) Applicant: ZTE CORPORATION, Shenzhen (CN)

(72) Inventors: Andrey Kochetkov, Cary, NC (US); Ying Shen, Chapel Hill, NC (US); Shawn Walsh, Cary, NC (US)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/881,536

(22) Filed: Jan. 26, 2018

(51) Int. Cl.
*H04L 27/26* (2006.01)
*H04B 7/08* (2006.01)
*H04L 25/03* (2006.01)
*H04B 1/16* (2006.01)

(52) U.S. Cl.
CPC ............ *H04B 7/0894* (2013.01); *H04B 1/16* (2013.01); *H04L 25/03* (2013.01); *H04L 27/2649* (2013.01)

(58) Field of Classification Search
CPC ...... H04B 7/08; H04B 7/0891; H04B 7/0894; H04B 1/16; H04L 27/2649; H04L 27/2655; H04L 25/03; H04L 25/03025
USPC ....... 375/259, 260, 267, 285, 316, 340, 346, 375/347, 349
See application file for complete search history.

(56) References Cited

U.S. PATENT DOCUMENTS

| 6,229,840 | B1* | 5/2001 | Ichihara | H04B 7/0894 375/147 |
| 6,275,482 | B1* | 8/2001 | Jevremovic | H01Q 1/246 342/375 |
| 2001/0047424 | A1* | 11/2001 | Alastalo | H04B 7/0842 709/236 |
| 2008/0192808 | A1* | 8/2008 | Schilling | G01S 3/42 375/140 |
| 2011/0129047 | A1* | 6/2011 | Mashino | H04B 1/1027 375/350 |

\* cited by examiner

*Primary Examiner* — Siu Lee
(74) *Attorney, Agent, or Firm* — Morgan, Lewis & Bockius LLP

(57) ABSTRACT

A radio receiver component includes a first antenna line for receiving a first signal and a second antenna line for receiving a second signal. Each of the first signal and the second signal is a respective intermediate frequency (IF) signal produced by down-converting a respective radio frequency (RF) signal received by a respective antenna. The first antenna line includes a demodulator that receives the first signal and down-converts the first signal to produce one or more baseband signals, one or more variable baseband delay paths that delay the one or more baseband signals, a modulator that receives the one or more delayed baseband signals and up-converts the one or more delayed baseband signals to produce a third IF signal. The radio receiver component further includes a combiner that receives and combines the second signal and the third signal to produce a fourth signal.

20 Claims, 4 Drawing Sheets

INTERMEDIATE FREQUENCY COMBINER WITH BASEBAND DELAY

TECHNICAL FIELD

The present invention relates to space-diversity antenna systems, and in particular, to space diversity antenna systems in which a variable time delay is applied to a main channel or diversity channel in a baseband frequency.

BACKGROUND

The present invention concerns space-diversity antenna systems, where signals from two distinct antennas are combined to improve signal-to-noise. Since one of these two signals will be delayed relative to the other (e.g., due to different spatial geometries and cable lengths, as described below), there is a need for time delay paths that are compatible with microwave radio channels. To reduce the number of necessary hardware options, these time delay paths should be variable, so that the components can be configured for different antenna system geometries.

SUMMARY

An object of the present application is to provide flexibility, agility, and cost reduction in microwave radio components.

To that end, a radio receiver component is provided. The radio receiver component includes a first antenna line for receiving a first signal and a second antenna line for receiving a second signal. Each of the first signal and the second signal is a respective intermediate frequency (IF) signal produced by down-converting a respective radio frequency (RF) signal received by a respective antenna. The first antenna line includes a demodulator that receives the first signal and down-converts the first signal to produce one or more baseband signals, one or more variable baseband delay paths that delay the one or more baseband signals, a modulator that receives the one or more delayed baseband signals and up-converts the one or more delayed baseband signals to produce a third IF signal. The radio receiver component further includes a combiner that receives and combines the second signal and the third signal to produce a fourth signal.

Further, a method of combining space diversity signals is provided. The method includes receiving, at a first antenna line, a first signal. The method further includes receiving, at a second antenna line, a second signal. Each of the first signal and the second signal is a respective intermediate frequency (IF) signal produced by down-converting a respective radio frequency (RF) signal received by a respective antenna. The method further includes down-converting, using a demodulator, the first signal to produce one or more baseband signals. The method further includes delaying, at a baseband frequency, the one or more baseband signals. The method further includes up-converting, using a modulator, the one or more delayed baseband signals to produce a third signal. The method further includes combining the second signal and the third signal to produce a fourth signal.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles. Like reference numerals refer to corresponding parts.

DETAILED DESCRIPTION

Figure 1:
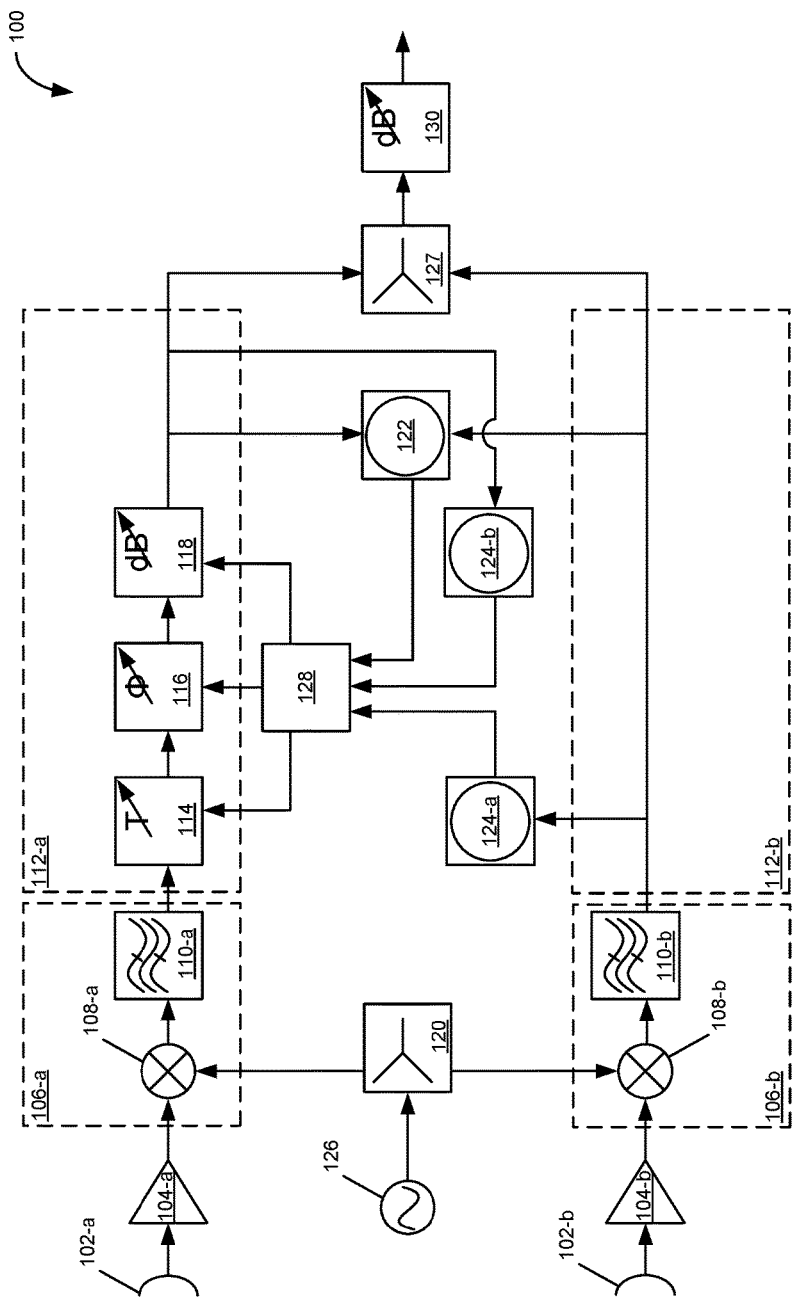
FIG. 1 is a schematic diagram of a space-diversity antenna system, in accordance with some embodiments.

Reference will now be made in detail to embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. With reference now to the figures, exemplary block diagrams of data processing environments are provided in which illustrative embodiments may be implemented. It should be appreciated that these figures are only exemplary and are not intended to assert or imply any limitation with regard to the environments in which different embodiments may be implemented. Many modifications to the depicted environments may be made.

As used herein, the term "coupled with" (or "coupled to") implies that there may be other components besides the recited components in the coupling. For example, when a mixer is coupled with a filter, there may be a low noise amplifier between the mixer and the filter. In this sense, the term "couples with" is different from "connects to," which as used herein implies a direct connection.

Space-diversity antenna systems are used in radio communication to improve the quality of received signals. A space-diversity antenna system uses a plurality of antennas (e.g., two antennas) to receive the same signal from a remote transmitter. For example, a space-diversity antenna system includes a main antenna (e.g., an antenna that both receives and transmits signals) and a diversity antenna (e.g., that receives the same signals as the main antenna, but does not include transmission circuitry). The main antenna and the diversity antenna may be mounted on separate poles, towers, or buildings (e.g., thirty feet apart).

The space-diversity antenna system improves the signal-to-noise of the signal received by the main antenna by combining it with the signal received from the diversity antenna. In some implementations, combining the signal received by the main antenna with the signal received by the diversity antenna (e.g., carrying the same information) is performed after down-converting each from a radio frequency (RF) to an intermediate frequency (IF) (e.g., the combining is performed using an IF combiner).

As used herein, an IF signal is a signal having a carrier wave with an intermediate frequency. An RF signal is a signal having a carrier wave with a radio frequency. In radio communication, signals are transmitted (e.g., by an antenna) with a carrier frequency in the RF range. Because many circuits and transmission lines behave poorly at RF frequencies, received radio signals are often down-converted to an intermediate frequency before electronic signal processing (e.g., at a modem). Similarly, transmitted radio signals are often processed at an intermediate frequency and subsequently up-converted to a radio frequency before being transmitted by an antenna. Intermediate frequencies are lower frequencies than radio frequencies. Microwave receivers typically use a 140 MHz intermediate frequency but may use different intermediate frequencies.

To combine the signal received from the main antenna with the signal received from the diversity antenna, the two signals must be coherent. For the two signals to be coherent the two signals must have the same carrier frequency (e.g., frequency coherence) and the same group delay (e.g., the same travel time from the remote transmitter to the location of a combiner where the two signals are combined). In some circumstances, the different waveguide lengths between, on one hand, the main antenna and the combiner and, on the other, the diversity antenna and the combiner, is a primary source of group delay difference that must be compensated for (e.g., in addition to the difference in propagation times between the remote transmitter and the two antennas).

Some embodiments described below provide methods and devices for delaying intermediate frequency signals, thus compensating for different path lengths in a space-diversity antenna system and providing coherence between a main antenna signal and a diversity antenna signal so that the two may be combined.

One challenge in designing space-diversity antenna systems is finding suitable variable time delay paths that operate at intermediate frequencies. To be useful in a broad range of antenna geometries, for example, in support of a 112 MHz channel bandwidth, time delay paths used in space-diversity antenna systems should provide 50 to 100 ns of maximum delay with 0.5 to 1 ns granularity in a wide frequency range (typically 80-200 MHz). Conventional intermediate frequency delay paths are excessively large or fail at the higher end of intermediate frequencies.

To that end, some embodiments described below solve the problems associated with intermediate frequency variable time delay paths (e.g., excessive length or frequency limitations) by converting the IF signal in the delayed channel to a baseband frequency and applying the time delay in the baseband frequency. The delayed baseband frequency signal is then up-converted back to intermediate frequency so that it can be combined with the signal from the non-delayed channel (e.g., which remains in the intermediate frequency throughout).

In some embodiments, the down-conversion of the IF signal to the baseband signal and the up-conversion of the delayed baseband signal back to the intermediate frequency is performed using the same reference signal (e.g., from a single local oscillator) so that frequency coherence is not lost by temporarily converting the signal to baseband.

Variable time delay paths for baseband frequencies are small (e.g., easily implemented as integrated circuits), inexpensive, and flexible. In addition, this scheme works over a broad frequency range. Since the variable time delay only needs to work at a narrow range of baseband frequencies, this scheme works for any intermediate frequency because any intermediate frequency can be converted to baseband through selection of an appropriate local oscillator and modulator. Thus, the variable time delay paths in these embodiments are small, inexpensive, and work over a broad range of frequencies.

FIG. 1 is a schematic diagram of a space-diversity antenna system 100, in accordance with some embodiments. In some embodiments, the space-diversity antenna system 100 has a split-mount architecture. In a split-mount architecture, radio frequency (RF) signals are received by one or more antennas, each of which is coupled to an outdoor unit (ODU) on, for example, a pole, tower, or rooftop. The RF signals are converted to intermediate frequency (IF) signals by the ODU. The IF signals are combined and carried (e.g., by a coaxial cable) to an indoor unit (IDU), which includes a modem.

For example, in a space-diversity antenna system, a main antenna is coupled to an ODU and a diversity antenna is also coupled to the ODU. In some embodiments, the signals are combined at the ODU and coupled with an IDU by a single coaxial cables. To do so, it is necessary to introduce a delay path into either the main antenna line or the diversity antenna line (e.g., the shorter of the two lines). This need arises, among other reasons, because of the difference in lengths of the cables between the main antenna and the ODU and and the diversity antennas and the ODU.

To that end, in the space-diversity antenna system 100, a first radio frequency (RF) signal is received by a first antenna 102-*a* (e.g., a main antenna). For example, the first RF signal is received from a remote transmitter. The first RF signal is amplified by a first low noise amplifier 104-*a* and down-converted to produce a first intermediate frequency (IF) signal by a first down-converter 106-*a*. The first down-converter 106-*a* includes a first mixer 108-*a* and a first filter 110-*a*. The first IF signal is received by a first antenna line 112-*a* (e.g., passed from the first down-converter 106-*a* to the antenna line 112-*a*, where it is received). A second radio frequency (RF) signal is received by a second antenna 102-*b* (e.g., a diversity antenna). For example, the second RF signal is received from the same remote transmitter from which the first RF signal was received and has the same carrier frequency as the first RF signal (e.g., the first RF signal and the second RF signal carry the same information, and are in a sense "the same signal," but are treated separately, as described below). The second RF signal is amplified by a second low noise amplifier 104-*b* and down-converted to produce a second IF signal by a second down-converter 106-*b*. The second down-converter 106-*b* includes a second mixer 108-*b* and a second filter 110-*b*. The second IF signal is received by a second antenna line 112-*b*.

In some circumstances, first antenna line 112-*a* and second antenna line 112-*b* are referred to as channels despite the fact that they carry the same information (e.g., one is considered a main channel and the other is considered a diversity channel).

In some embodiments, the first mixer 108-*a* and the second mixer 108-*b* are each coupled to an oscillator 126 (e.g., a local oscillator). A local oscillator and a mixer are used to change the frequency of a signal. This frequency conversion process, also called heterodyning, produces the sum and difference frequencies from the frequency of the local oscillator and frequency of the input signal.

The oscillator 126 provides a reference signal that is split by splitter 120 and provided to both the first mixer 108-*a* and the second mixer 108-*b* so that the first IF signal and the second IF signal are produced (e.g., modulated) with the same carrier frequency. For example, the first mixer 108-*a* mixes the first RF signal with the reference signal, and, taking the difference between the reference signal and the frequency of the first RF signal, down-converts the first RF signal to the first IF signal (e.g., the first IF signal is modulated at a respective IF frequency). The second mixer 108-*b* mixes the second RF signal with the same reference signal, and, taking the difference between the reference signal and the frequency of the second RF signal, down-converts the second RF signal to the second IF signal. Thus, both the first IF signal and the second IF signal have the same IF carrier frequency, providing frequency coherence between the signals passed to the first antenna line 112-a and the second antenna line 112-b (e.g., the second IF signal is modulated at the same respective IF frequency as the first IF signal).

The first antenna line 112-a includes a variable time delay path 114, a variable phase shifter 116, and a variable gain amplifier 118. The output of first antenna line 112-a is a third IF signal that is combined with the second IF signal at combiner 127 to produce a fourth IF signal. The fourth IF signal carries the same information as the first IF signal, the second IF signal, and the third IF signal. In some circumstances, the fourth IF signal has an improved signal-to-noise ratio as compared to the first IF signal. The fourth IF signal is optionally amplified with a variable gain by variable gain amplifier 130 and then output (e.g., to other receiver components). Time delay path 114 and phase shifter 116 provide coarse and fine time delays to the first IF signal, respectively, to provide the necessary group delay coherence before the second IF signal and the third IF signal are combined by combiner 127.

The space-diversity antenna system 100 includes a first amplitude detector 124-a that detects an amplitude of the second IF signal and a second amplitude detector 124-b that detects an amplitude of the third IF signal. The amplitude of the second IF signal detected by the first amplitude detector 124-a and the amplitude of the third IF signal detected by the second amplitude detector 124-b are provided to control circuit 128 as a feedback signal. Using the difference in amplitudes as a feedback signal, the control circuit 128 sets the variable gain amplifier 118 to apply a gain that minimizes the difference in amplitudes between the third IF signal that the second IF signal (e.g., the control circuit 128 provides negative feedback to the difference in amplitudes).

The space-diversity antenna system 100 includes a phase detector 122 that detects a phase difference between the second IF signal and the third IF signal. The phase difference measured by phase detector 122 is used by control circuit 128 as a feedback signal to vary a phase shift applied by the variable phase shifter 116. The feedback minimizes the group delay between the third IF signal and the second IF signal (e.g., applies negative feedback to the phase difference between the third IF signal and the second IF signal). Thus, after phase shifter 116, the second IF signal and the third IF signal are group-delay coherent. In some embodiments, the variable time delay path 114 is configured once (e.g., when the first antenna line 112-a is installed).

Since no two diversity antenna setups are alike (e.g., have the same difference in group delay between main and diversity antennas), the variability of time-delay path 114 allows these components to be manufactured for space-diversity systems generally, and subsequently configured for individual setups. The time and phase delays are generally added to the antenna line for the antenna with the shorter distance to the ODU. This gives the signal on the longer line a chance to catch up.

One challenge in designing the space-diversity antenna system 100 is finding suitable intermediate frequency implementations of variable time delay path 114. To be useful in a broad range of antenna geometries, for example, in support of a 112 MHz channel bandwidth, variable time delay path 114 should provide a variable delay in a range of 0 to MAX ns, where MAX is between 50 to 100 ns. In addition, variable time delay path 114 should provide 0.5 to 1 ns granularity in a wide frequency range (typically 80-200 MHz).

In some embodiments, variable time delay path 114 is realized using a set of coaxial cables of different lengths. Time delay in the cable is proportional to the cable's length. Thus, selecting cables of different lengths provides different delays. Using coaxial cables as variable time delay path 114 provides good linearity and wide frequency bandwidth. However, coaxial cables are disadvantageous because of their size. For example, a 1 nanosecond (ns) delay requires a coaxial cable approximately 15 centimeters (cm) in length. As another example, a 32 ns delay requires a coaxial cable approximately 4.8 meters (m) in length.

In some embodiments, variable time delay path 114 is realized using passive delay lines. Passive delay lines comprise a network of LC components (inductance-capacitance components). The delay provided by the passive delay line is configured through selection of inductance and capacitance values in the network. Passive delay lines can be miniaturized, but have a limit to the maximum frequency that can pass through. For example, an integrated circuit (IC) implementation of a 50 ns delay line from Rhombus Industries Inc. has a maximum frequency of approximately 35 MHz.

Figure 2:
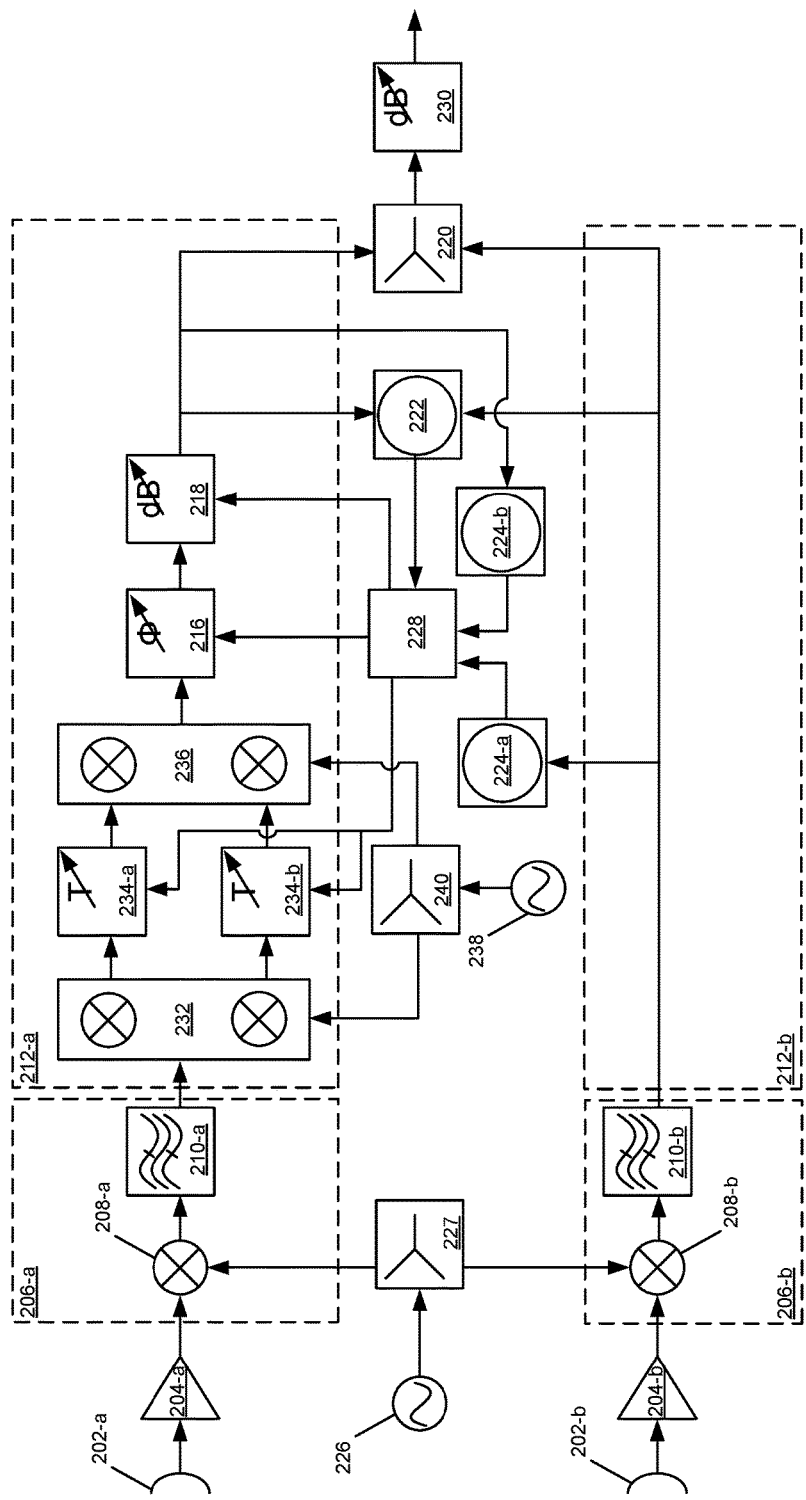
FIG. 2 is a schematic diagram of a space-diversity antenna system with a baseband delay, in accordance with some embodiments.

FIG. 2 is a schematic diagram of a space-diversity antenna system 200 with a baseband delay, in accordance with some embodiments. Space-diversity antenna system 200 solves the problems associated with intermediate frequency variable time delay paths (e.g., excessive length or frequency limitations) by converting the IF signal in the delayed channel to a lower baseband frequency and applying the time delay in the baseband frequency. The delayed baseband frequency signal is then up-converted back to intermediate frequency so that it can be combined with the signal from the non-delayed channel (e.g., which remains in the intermediate frequency throughout).

In some embodiments, the down-conversion of the IF signal to the baseband signal and the up-conversion of the delayed baseband signal back to the intermediate frequency is performed using the same reference signal (e.g., from a single local oscillator) so that frequency coherence is not lost by temporarily converting the signal to baseband.

Variable time delay paths for baseband frequencies are small (e.g., easily implemented as integrated circuits), inexpensive, and flexible. In addition, this scheme works over a broad frequency range. Since the variable time delay only needs to work at a narrow range of baseband frequencies, this scheme works for any intermediate frequency because any intermediate frequency can be converted to baseband through selection of an appropriate local oscillator and modulator. Thus, the variable time delay paths in these embodiments are small, inexpensive, and work over a broad range of frequencies.

To that end, in the space-diversity antenna system 200, a first radio frequency (RF) signal is received by a first antenna 202-a (e.g., a main antenna). For example, the first RF signal is received from a remote transmitter. The first RF signal is amplified by a first low noise amplifier 204-a and down-converted to produce a first intermediate frequency (IF) signal by a first down-converter 206-a. The first down-converter 206-a includes a first mixer 208-a and a first filter 210-a. The first IF signal is received by a first antenna line 212-a (e.g., passed from the first down-converter 206-a to the antenna line 212-a, where it is received). A second radio frequency (RF) signal is received by a second antenna 202-b (e.g., a diversity antenna). For example, the second RF signal is received from the same remote transmitter from which the first RF signal was received and has the same carrier frequency as the first RF signal (e.g., the first RF signal and the second RF signal carry the same information, and are in a sense "the same signal," but are treated separately, as described below). The second RF signal is amplified by a second low noise amplifier 204-*b* and down-converted to produce a second IF signal by a second down-converter 206-*b*. The second down-converter 206-*b* includes a second mixer 208-*b* and a second filter 210-*b*. The second IF signal is received by a second antenna line 212-*b*.

In some circumstances, first antenna line 212-*a* and second antenna line 212-*b* are referred to as channels despite the fact that they carry the same information (e.g., one is considered a main channel or the other is considered a diversity channel).

In some embodiments, the first mixer 208-*a* and the second mixer 208-*b* are each coupled to an oscillator 226 (e.g., a local oscillator). A local oscillator and a mixer are used to change the frequency of a signal. This frequency conversion process, also called heterodyning, produces the sum and difference frequencies from the frequency of the local oscillator and frequency of the input signal.

The oscillator 226 provides a reference signal that is split by splitter 227 and provided to both the first mixer 208-*a* and the second mixer 208-*b* so that the first IF signal and the second IF signal are produced (e.g., modulated) with the same carrier frequency. For example, the first mixer 208-*a* mixes the first RF signal with the reference signal, and, taking the difference between the reference signal and the frequency of the first RF signal, down-converts the first RF signal to the first IF signal (e.g., the first IF signal is modulated at a respective IF frequency). The second mixer 208-*b* mixes the second RF signal with the same reference signal, and, taking the difference between the reference signal and the frequency of the second RF signal, down-converts the second RF signal to the second IF signal. Thus, both the first IF signal and the second IF signal have the same IF carrier frequency, providing frequency coherence between the signals passed to the first antenna line 212-*a* and the second antenna line 212-*b* (e.g., the second IF signal is modulated at the same respective IF frequency as the first IF signal).

As noted above, the space-diversity antenna system 200 converts one of the IF signals (e.g., the delayed signal) to baseband before applying a variable time delay. To that end, the first antenna line 212-*a* includes a demodulator 232 that receives the first IF signal and down-converts the first IF signal to produce one or more baseband signals. In some embodiments, the one or more baseband signals include an in-phase (I) and quadrature (Q) signal).

The first antenna line 212-*a* includes one or more variable baseband time delay paths 234 (e.g. variable baseband delay path 234-*a* and 234-*b*) that delay the one or more baseband signals (e.g., provide a course time delay). In some embodiments, the one or more baseband delay paths are integrated circuits. In some embodiments, the one or more baseband delay paths include two distinct baseband delay paths (e.g., a baseband delay path for the in-phase (I) signal and a distinct baseband delay path for the quadrature (Q) signal). In some embodiments, the distinct baseband delay paths are portions of a single integrated circuit device. For example, the AD8120 by Analog Devices is a triple skew-compensating video delay line operating in the baseband with analog and digital control. It has a maximum delay of 50 ns. Such a device is typically used for video applications, where variable delays are applied to, for example, three color channels (e.g., red, green, and blue channels). In some embodiments, only two of the channels are needed for the present invention (e.g., the "red" channel of the AD8120 is used for the in-phase signal, the "blue" channel of the AD8120 is used for the quadrature signal, and the "green" channel is unused). In some embodiments, the one or more variable baseband delay paths are configured to apply the same delay to the in-phase (I) signal and the quadrature (Q) signal.

The first antenna line 212-*a* includes a modulator 236 that receives the one or more delayed baseband signals and up-converts the one or more delayed baseband signals to produce a third IF signal. The third IF signal is combined with the second IF signal at combiner 220 to produce a fourth IF signal. The fourth IF signal carries the same information as the first IF signal, the second IF signal, and the third IF signal. In some circumstances, the fourth IF signal has an improved signal-to-noise ratio as compared to the first IF signal. The fourth IF signal is optionally amplified with a variable gain by variable gain amplifier 230 and then output (e.g., to other receiver components).

In some embodiments, the space-diversity antenna system 200 includes an oscillator 238 coupled with the demodulator 232 and the modulator 236. The oscillator 238 provides a reference signal to the demodulator 232 and the same reference signal to the modulator 236 so that the first signal and the third signal are modulated at the same frequency. For example, the reference signal is split by a splitter 240 between demodulator 232 and modulator 236. Thus, space-diversity antenna system 200 ensures frequency coherence of the combined signals (e.g. the second IF signal and the third IF signal) in the following manner: the first IF signal and the second IF signal have the same carrier frequency because each is down-converted using the same local oscillator 226; the first IF signal and the third IF signal have the same carrier frequency because the third IF signal is produced by down-converting the first IF signal to baseband and then up-converting the baseband signal using the same local oscillator 238.

In some embodiments, the demodulator 232 is a quadrature demodulator that includes two mixers (one for each of the I and Q signals) and a 90 degree phase shifter that shifts the reference signal from oscillator 238 by 90 degrees for either the I or Q signal's mixer.

In some embodiments, the modulator 236 is a quadrature modulator that includes two mixers (one for each of the I and Q signals) and a 90 degree phase shifter that shifts the reference signal from oscillator 238 by 90 degrees for either the I or Q signal's mixer.

The space-diversity antenna system 200 includes a first amplitude detector 224-*a* that detects an amplitude of the second IF signal and a second amplitude detector 224-*b* that detects an amplitude of the third IF signal. The amplitude of the second IF signal detected by the first amplitude detector 224-*a* and the amplitude of the third IF signal detected by the second amplitude detector 224-*b* are provided to control circuit 228 as a feedback signal. Using the difference in amplitudes as a feedback signal, the control circuit 228 sets the variable gain amplifier 218 to apply a gain that minimizes the difference in amplitudes between the third IF signal that the second IF signal (e.g., the control circuit 228 provides negative feedback to the difference in amplitudes).

In some embodiments, fine adjustment to the time delay (e.g., phase shifting) is performed at an intermediate frequency. To that end, the space-diversity antenna system 200 includes a variable phase shifter 216 and a phase detector 222 that detects a phase difference between the second IF signal and the third IF signal. The phase difference measured by phase detector 222 is used by control circuit 228 as a feedback signal to vary a phase shift applied by the variable phase shifter 216. The feedback minimizes the group delay between the third IF signal and the second IF signal (e.g., applies negative feedback to the phase difference between the third IF signal and the second IF signal). Thus, after phase shifter 216, the second IF signal and the third IF signal are group-delay coherent). In some embodiments, the variable time delay paths 234 are configured once (e.g., when the first antenna line 212-a is installed).

Figure 3:
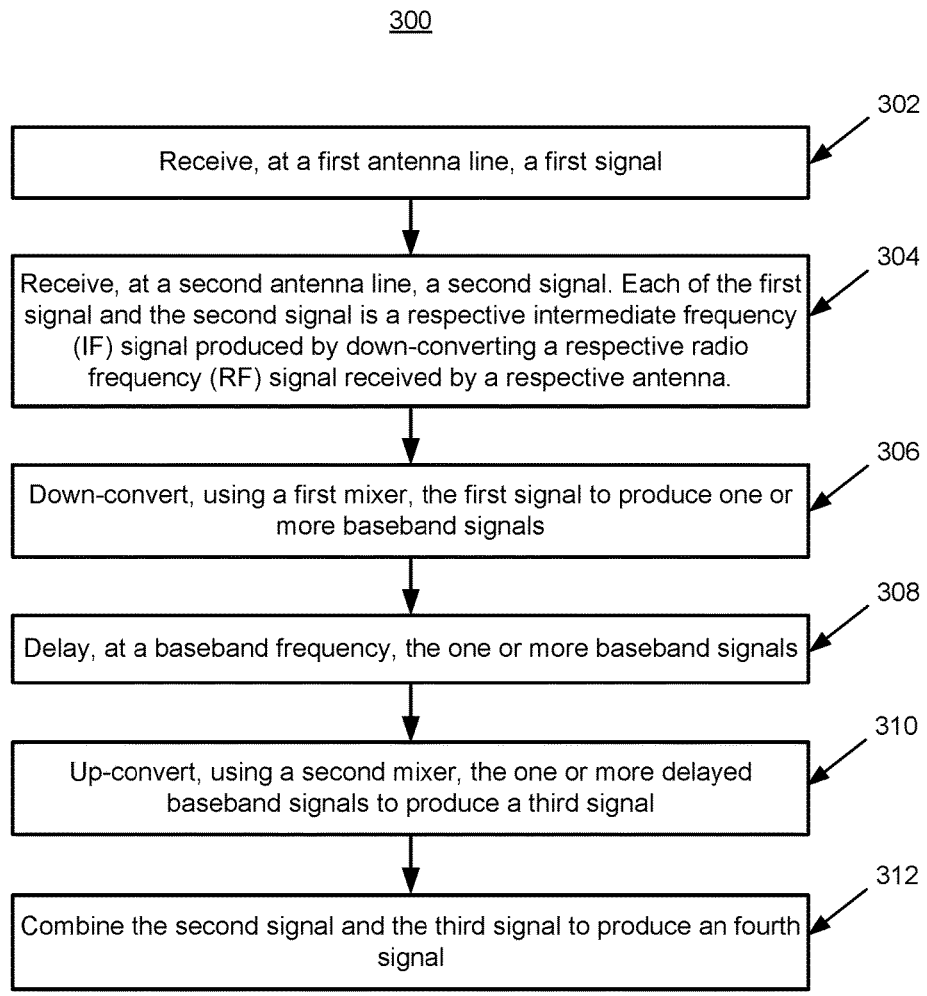
FIG. 3 is a flowchart of a method of combining radio signals, in accordance with some embodiments.

FIG. 3 is a flowchart of a method 300 of combining radio signals, in accordance with some embodiments. In some embodiments, the method 300 is performed at a space-diversity antenna system, such as space-diversity antenna system 200 (FIG. 2).

The method 300 includes receiving (302), at a first antenna line (e.g., first antenna line 212-a, FIG. 2), a first signal. The method 300 includes receiving (304), at a second antenna line (second antenna line 212-b), a second signal. Each of the first signal and the second signal is a respective intermediate frequency (IF) signal produced by down-converting a respective radio frequency (RF) signal received by a respective antenna (e.g. antennas 204-a and 204-b, FIG. 2).

In some embodiments, the respective radio frequency signal used to produce the first signal and the respective radio frequency signal used to produce the second signal are received from a remote transmitter (e.g., a remote radio). In some embodiments, the respective radio frequency signal used to produce the first signal and the respective radio frequency signal used to produce the second signal are the same radio frequency signal (e.g. the first signal and the second signal are redundant). In some embodiments, the first signal and the second signal are representations of the same information. In some embodiments, the respective radio frequency signal used to produce the first signal and the respective radio frequency signal used to produce the second signal are spatially-diverse radio frequency signals (e.g., received at distinct and spatially-separated antennas, such as a main antenna and a diversity antenna).

In some embodiments, the first signal is a first IF signal and the second signal is a second IF signal. The method 300 includes receiving a first RF signal and down-converting, using a first mixer, the first RF signal to produce the first IF signal. The method 300 further includes receiving a second RF signal and down-converting, using a second mixer, the second RF signal to produce the second IF signal. The method 300 further includes providing a reference signal (e.g., from a local oscillator) to the first mixer and the second mixer so that the first IF signal is modulated at a respective IF frequency and the second IF signal is modulated at the same IF frequency (e.g., both the first IF signal and the second IF signal have the same carrier frequency, the respective IF frequency, and thus the first IF signal and the second IF signal are frequency coherent).

The method 300 includes down-converting (306), using a demodulator (e.g., demodulator 232, FIG. 2), the first signal to produce one or more baseband signals. The method 300 includes delaying (308), at a baseband frequency, the one or more baseband signals. In some embodiments, the one or more baseband signals includes an in-phase (I) signal in the baseband range and a quadrature (Q) signal in the baseband range.

In some embodiments, the method 300 includes varying the delay (e.g., a course delay) applied to the one or more baseband signals. In some embodiments, varying the delay applied to the one or more baseband signals is performed when the system is installed (e.g., as part of the setup). In some embodiments, varying the delay includes compensating for a difference in length between the first antenna line and the second antenna line (e.g. a difference in length between the first antenna and a combiner and the second antenna and the combiner).

The method 300 includes up-converting (310), using a modulator (e.g. modulator 236, FIG. 2), the one or more delayed baseband signals to produce a third signal. In some embodiments, the method 300 includes providing a reference signal (e.g., from a local oscillator) to the demodulator and the same reference signal to the modulator so that the first signal and the third signal are modulated at the same frequency (e.g., the first signal and the third signal are frequency coherent).

In some embodiments, down-converting the first signal to produce one or more baseband signals, delaying the one or more baseband signals, and up-converting the one or more delayed baseband signals to produce a third signal comprise a process of applying a course delay to the first signal to produce the third signal (e.g. to produce group delay coherence between the second signal and the third signal before they are combined). In some embodiments, varying the delay applied to the one or more baseband signals is performed to produce group delay coherence between the second signal and the third signal before they are combined.

In some embodiments, the method 300 includes applying a variable phase delay to the third signal. In some embodiments, applying a variable phase delay to the third signal comprises a process of applying a fine delay to the third signal (e.g. to produce group delay coherence between the second signal and the third signal before they are combined).

The method 300 includes combining (312) the second signal and the third signal to produce a fourth signal. In some embodiments, the fourth signal is a representation of the same information as the second signal and the third signal (and the first signal). The fourth signal has a higher signal-to-noise ratio than the second signal or the third signal (or the first signal).

Figure 4:
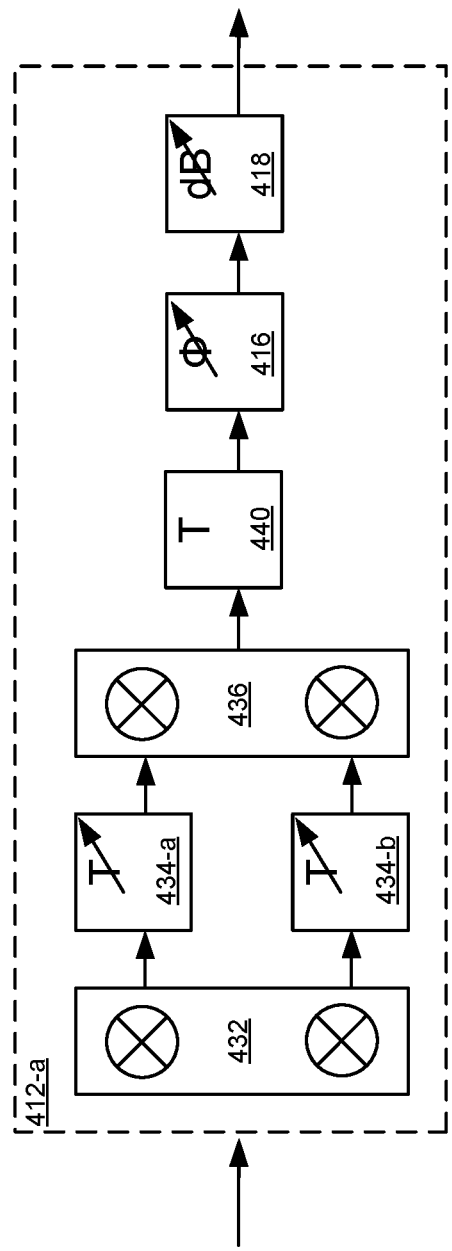
FIG. 4 is a schematic diagram of an antenna line with baseband and intermediate frequency time delay paths, in accordance with some embodiments.

FIG. 4 is a schematic diagram of an antenna line 412-a with baseband and intermediate frequency time delay paths, in accordance with some embodiments. For visual simplicity, the control circuits and reference signals (e.g., as shown in FIG. 2) are not shown in FIG. 4, but may be coupled to and used in conjunction with control circuits and reference signals analogous to those described with reference to FIG. 2. Antenna line 412-a is analogous to antenna line 212-a (FIG. 2) except that antenna line 412-a includes intermediate frequency delay path 440. Thus, antenna line 412-a includes demodulator 432 and modulator 436 (analogous to demodulator 232 and modulator 236, respectively, FIG. 2), one or more variable baseband time delay paths 434 (e.g. variable baseband delay path 434-a and 434-b, analogous to 234-a and 234-b, respectively, FIG. 2) phase shifter 416 (analogous to phase shifter 216, FIG. 2), and amplifier 418 (analogous to amplifier 218, FIG. 2).

Intermediate frequency delay path 440 may be a fixed delay path (e.g., a 50 ns fixed coaxial delay line) or a variable delay path (e.g., comprising a set of fixed delay lines of different lengths). For example, when variable baseband delay paths 434-a and 434-b provide a maximum delay of 50 ns, the variable delay range can be extended (e.g., shifted) to 50-100 ns by adding a fixed IF delay path 440 having a 50 ns delay.

Alternatively, when delay path 440 is a variable delay path comprising a set of fixed delay lines of different lengths, IF delay path 440 can include, for example, a zero delay line (relatively speaking, e.g., the zero delay line is the delay line against which other delays are measured), a 50 ns delay line, a 100 ns delay line, and a 150 ns delay line.

Because such an IF delay path 440 is combined with, for example, variable baseband delay paths 434-*a* and 434-*b* providing a maximum delay of 50 ns, antenna line 412-*a* provides a variable delay of 0 to 200 ns. Combining a variable baseband delay path with a variable IF delay path greatly reduces the granularity requirements of the variable IF delay path as compared to an antenna line with only a variable IF delay path. In some embodiments, IF delay path 440 (when variable) is configured once upon installation and thus is not coupled with a control circuit. In some embodiments, IF delay path 440 is coupled with a control circuit (control circuit 228, FIG. 2) which uses feedback to reduce the group delay difference between the two antenna lines.

The description of the present application has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc. may be used herein to describe various elements, these elements should not be limited by these terms. These terms are only used to distinguish one element from another. For example, a first port could be termed a second port, and, similarly, a second port could be termed a first port, without departing from the scope of the embodiments. The first port and the second port are both ports, but they are not the same port.

Many modifications and alternative embodiments of the embodiments described herein will come to mind to one skilled in the art having the benefit of the teachings presented in the foregoing descriptions and the associated drawings. Therefore, it is to be understood that the scope of claims are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The embodiments were chosen and described in order to best explain the underlying principles and their practical applications, to thereby enable others skilled in the art to best utilize the underlying principles and various embodiments with various modifications as are suited to the particular use contemplated.

What is claimed is:

1. A radio receiver component, comprising:
   a first antenna line for receiving a first signal;
   a second antenna line for receiving a second signal, wherein each of the first signal and the second signal is a respective intermediate frequency (IF) signal produced by down-converting a respective radio frequency (RF) signal received by a respective antenna,
   the first antenna line including:
      a demodulator that receives the first signal and down-converts the first signal to produce one or more baseband signals;
      one or more variable baseband delay paths that delay the one or more baseband signals; and
      a modulator that receives the one or more delayed baseband signals and up-converts the one or more delayed baseband signals to produce a third IF signal; and
   a combiner that receives and combines the second signal and the third signal to produce a fourth signal.

2. The radio receiver component of claim 1, wherein the one or more variable baseband delay paths comprise an integrated circuit.

3. The radio receiver component of claim 1, further including:
   an oscillator coupled with the demodulator and the modulator;
   wherein the oscillator provides a reference signal to the demodulator and the same reference signal to the modulator so that the first signal and the third signal are modulated at the same frequency.

4. The radio receiver component of claim 1, further including:
   a main antenna coupled with one of the first antenna line and the second antenna line; and
   a diversity antenna coupled with the other of the first antenna and the second antenna line.

5. The radio receiver component of claim 4, wherein the first signal and the second signal are representations of the same information.

6. The radio receiver component of claim 4, wherein the fourth signal is a representation of the same information as the first signal and the second signal and the fourth signal has a higher signal-to-noise ratio than the first signal or the second signal.

7. The radio receiver component of claim 1, wherein the one or more baseband signals include:
   an in-phase (I) signal in the baseband range; and
   a quadrature (Q) signal in the baseband range.

8. The radio receiver component of claim 7, wherein the one or more variable baseband delay paths include a distinct time delay path for each of the in-phase signal and the quadrature signal.

9. The radio receiver component of claim 1, wherein the first antenna line further includes a variable phase delay path that applies a variable phase delay to the third signal.

10. The radio receiver component of claim 1, further including an intermediate frequency delay path.

11. The radio receiver component of claim 1, wherein:
   the first signal is a first IF signal and the second signal is a second IF signal; and
   the radio receiver component further includes:
      a first mixer that receives a first RF signal and down-converts the first RF signal to produce the first IF signal;

a second mixer that receives a second RF signal and down-converts the second RF signal to produce the second IF signal; and a second oscillator coupled with the first mixer and the second mixer;

wherein the second oscillator provides a second reference signal to the first mixer and the same second reference signal to the second mixer so that the first IF signal and the second IF signal are modulated at the same frequency.

12. A method of combining space diversity signals, comprising:

receiving, at a first antenna line, a first signal;

receiving, at a second antenna line, a second signal, wherein each of the first signal and the second signal is a respective intermediate frequency (IF) signal produced by down-converting a respective radio frequency (RF) signal received by a respective antenna;

down-converting, using a demodulator, the first signal to produce one or more baseband signals;

delaying, at a baseband frequency, the one or more baseband signals; and up-converting, using a modulator, the one or more delayed baseband signals to produce a third signal; and combining the second signal and the third signal to produce a fourth signal.

13. The method of claim 12, further including, varying the delay applied to the one or more baseband signals.

14. The method of claim 12, further including, providing a reference signal to the demodulator and the same reference signal to the modulator so that the first signal and the third signal are modulated at the same frequency.

15. The method of claim 12, wherein the first signal and the second signal are representations of the same information.

16. The method of claim 12, wherein the fourth signal is a representation of the same information as the first signal and the second signal and the fourth signal has a higher signal-to-noise ratio than the first signal or the second signal.

17. The method of claim 12, wherein the one or more baseband signals includes:

an in-phase (I) signal in the baseband range; and a quadrature (Q) signal in the baseband range.

18. The method of claim 12, further including, applying a variable phase delay to the third signal.

19. The method of claim 12, wherein:

the first signal is a first IF signal and the second signal is a second IF signal; and the method further includes:

receiving a first RF signal and down-converting, using a first mixer, the first RF signal to produce the first IF signal;

receiving a second RF signal and down-converting, using a second mixer, the second RF signal to produce the second IF signal; and providing a second reference signal to the first mixer and the second mixer so that the first IF signal is modulated at a respective IF frequency and the second IF signal is modulated at the same IF frequency.

20. The method of claim 12, further including, delaying, at an intermediate frequency, the third signal.

* * * * *